United States Patent
Gafni et al.

(10) Patent No.: US 12,476,894 B2
(45) Date of Patent: Nov. 18, 2025

(54) METHOD AND SYSTEM TO MODULATE TELEMETRY DATA

(71) Applicant: MELLANOX TECHNOLOGIES, LTD., Yokneam (IL)

(72) Inventors: Barak Gafni, Sunnyvale, CA (US); Niv Aibester, Herzliya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/900,828

(22) Filed: Aug. 31, 2022

(65) Prior Publication Data
US 2024/0073118 A1 Feb. 29, 2024

(51) Int. Cl.
*H04L 41/5009* (2022.01)
*H04L 43/55* (2022.01)
*H04L 67/12* (2022.01)

(52) U.S. Cl.
CPC .......... *H04L 43/55* (2022.05); *H04L 41/5009* (2013.01); *H04L 67/12* (2013.01)

(58) Field of Classification Search
CPC ...... H04L 43/55; H04L 41/5009; H04L 67/12
See application file for complete search history.

(56) References Cited

U.S. PATENT DOCUMENTS

| | | | | |
|---|---|---|---|---|
| 11,405,261 B1* | 8/2022 | Myla | ......................... | H04Q 9/04 |
| 11,729,075 B1* | 8/2023 | Qu | .......................... | H04L 43/08 |
| | | | | 709/224 |
| 2011/0028141 A1* | 2/2011 | Yang | ..................... | H04L 1/0026 |
| | | | | 455/422.1 |
| 2013/0088997 A1* | 4/2013 | Briscoe | ................. | H04L 47/326 |
| | | | | 370/252 |
| 2016/0294566 A1* | 10/2016 | Pan | ...................... | H04L 43/0829 |
| 2019/0149440 A1* | 5/2019 | Rantzau | .............. | H04L 63/1425 |
| | | | | 370/241 |
| 2021/0028969 A1* | 1/2021 | Li | ........................... | H04L 67/10 |
| 2021/0218651 A1* | 7/2021 | Rangarajan | ........... | H04W 28/10 |
| 2022/0271987 A1* | 8/2022 | McCallen | ........... | H04L 43/0852 |
| 2022/0272012 A1* | 8/2022 | Alam | .................. | H04L 41/5019 |
| 2022/0417147 A1* | 12/2022 | Woodworth | ............ | H04L 45/70 |

* cited by examiner

*Primary Examiner* — Lesa M Kennedy
(74) *Attorney, Agent, or Firm* — Sheridan Ross P.C.

(57) ABSTRACT

Methods, systems, and computer program products to modulate telemetry data as a function to represent the performance of a network and/or individual devices connected to the network. In embodiments, the method includes receiving telemetry data that has been sampled at a given point of time, wherein the telemetry data is associated with a performance metric of a device; processing the telemetry data as a function representing performance of the network device, wherein processing the telemetry data comprises modulating the telemetry data at the given point of time to previously sampled telemetry data based on the function; and demodulating the modulated telemetry data. In embodiments, the method also includes transferring the modulated telemetry data for reporting.

18 Claims, 6 Drawing Sheets

METHOD AND SYSTEM TO MODULATE TELEMETRY DATA

FIELD OF TECHNOLOGY

The present disclosure relates to processing telemetry data in a network device. More specifically, the present disclosure relates to modulating telemetry data to represent the performance of a network and/or individual devices connected to the network.

BACKGROUND

Telemetry in networking provides the ability to monitor and retrieve information (e.g., status-based and/or event-based telemetry information) from a network, for example, from one or more connected devices (e.g., a switch, router, network interface card (NIC), etc.). Telemetry in networking may be used to determine the health of a network, including the health and/or performance of individual devices within the network. Telemetry allows users to pro-actively handle potential issues, debug issues, and even reprogram the network accordingly. As networks grow and data transmission rates rise, there is a challenge to provide accurate and constant telemetry data regarding networking resources (e.g., a network device) in use.

SUMMARY

The described techniques relate to improved methods, systems, devices, and apparatuses that support modulation of telemetry data to generate a function representing performance of a network and/or network device(s). By modulating telemetry data, the present disclosure reduces the amount of telemetry data needed to monitor a network accurately and continually and/or track its resources. In embodiments, the telemetry data is sampled and modulated locally, reducing the amount of telemetry transferred to a monitoring device. The monitoring device demodulates the modulated telemetry data and determines a performance metric associated with the telemetry data. The monitoring device may modulate the telemetry data for storage (e.g., reduce storage space needed to store the telemetry data).

In existing solutions, an application-specific integrated circuit (ASIC) from an on-board CPU, or on-chip processor, may be polled for the telemetry data. However, existing solutions require enough devices (e.g., a threshold number of devices) be polled with a required frequency, which increases strain on the network. Additionally, existing solutions are not scalable and are bound by the amount of data that can be sent out from the ASIC.

One type of telemetry data is data based on counters that count various events, such as the number of packets received on a port, or the number of routing accesses performed. Another type of telemetry data is based on a status (e.g., gauge) of various resources (e.g., network devices, etc.), such as current buffer fill level (e.g., buffer size), queue length, current bandwidth (BW) transmitted on a given port, etc. Yet another type of telemetry data is event-driven data, where an indication is sent upon an event occurring, such as a buffer exceeding a threshold, latency exceeding a threshold, dropped packets exceeding a threshold, etc. As can be expected, depending on the size of a networked system, the volume of telemetry data reported can become large, which requires bandwidth to transmit and bandwidth to process. The present disclosure addresses these problems by reducing the amount of telemetry data required to monitor a network and/or individual network devices accurately and continuously.

A system, comprising: a network device that receives telemetry data that has been sampled at a given point of time, wherein the received telemetry data is associated with a performance metric of the network device; the network device that processes the received telemetry data as a function representing performance of the network device, wherein processing the telemetry data comprises modulating the telemetry data at the given point of time to previously sampled telemetry data based on the function; and the network device that transfers the modulated telemetry data for reporting.

The system, further comprising a monitor device that receives the modulated telemetry data; the monitor device that demodulates the modulated telemetry data; and the monitor device that determines whether the performance metric associated with the demodulated telemetry data exceeds a predetermined value.

A telemetry device to monitor a network, the telemetry device performs the steps of: receiving modulated telemetry data that has been sampled at a given point of time, wherein the telemetry data is associated with a performance metric of a network device; demodulating the modulated telemetry data to determine whether the performance metric associated with the demodulated telemetry data exceeds a predetermined value; and if the demodulated telemetry data exceeds the predetermined value, then performing an action based on the demodulated telemetry data exceeding the predetermined value.

A method of telemetry, the method comprising: receiving telemetry data that has been sampled at a given point of time, wherein the telemetry data is associated with a performance metric of a network device; processing the telemetry data as a function representing performance of the network device, wherein processing the telemetry data comprises modulating the telemetry data at the given point of time to previously sampled telemetry data based on the function; and demodulating the modulated telemetry data to determine whether the performance metric associated with the demodulated telemetry data exceeds a predetermined value.

A system is provided that includes: a communication interface that: provides connectivity with a network device; and receives telemetry data that has been sampled at a given point of time, wherein the telemetry data is associated with a performance metric of a network device; and control circuitry that: processes the telemetry data as a function representing performance of the network device, wherein processing the telemetry data comprises modulating the telemetry data at the given point of time to previously sampled telemetry data based on the function; and transfers the modulated telemetry data for reporting A telemetry device is provided that performs steps of: receiving telemetry data that has been sampled at a given point of time, wherein the telemetry data is associated with a performance metric of a network device; processing the telemetry data as a function representing performance of the network device, wherein processing the telemetry data comprises modulating the telemetry data at the given point of time to previously sampled telemetry data based on the function; and if the modulated telemetry data exceeds a predetermined value, then performing an action based on the modulated telemetry data exceeding the predetermined value.

A method of telemetry, the method comprising receiving telemetry data that has been sampled at a given point of time, wherein the telemetry data is associated with a performance metric of a network device; processing the telemetry data as a function representing performance of the network device, wherein processing the telemetry data comprises modulating the telemetry data at the given point of time to previously sampled telemetry data based on the function; and if the modulated telemetry data exceeds a predetermined value, then performing an action based on the modulated telemetry data exceeding the predetermined value.

A machine-readable medium is provided having data stored thereon, which if executed by one or more processors, cause the one or more processors to: receive telemetry data that has been sampled at a given point of time, wherein the telemetry data is associated with a performance metric of a network device; process the telemetry data as a function representing performance of the network device, wherein processing the telemetry data comprises modulating the telemetry data at the given point of time to previously sampled telemetry data based on the function; and transferring the modulated telemetry data for reporting.

Examples may include one of the following features, or any combination thereof.

In some examples of the method, system, and machine-readable medium described herein, the telemetry data is processed at a centralized component.

In some examples of the method, system, and machine-readable medium described herein, the telemetry data is sampled by an Application Specific Integrated Circuit (ASIC) within the network device.

In some examples of the method, system, and machine-readable medium described herein, the telemetry data is sampled by a component in the network device but not by an Application Specific Integrated Circuit (ASIC).

In some examples of the method, system, and machine-readable medium described herein, the telemetry data represents a queue length.

In some examples of the method, system, and machine-readable medium described herein, the telemetry data represents a buffer size.

In some examples of the method, system, and machine-readable medium described herein, the telemetry data represents a forwarding-flow load/occupancy.

In some examples of the method, system, and machine-readable medium described herein, wherein the forwarding-flow load/occupancy is measured by one of: a discarded packet counter or a passed packet counter.

In some examples of the method, system, and machine-readable medium described herein, the telemetry data is modulated using a modulation technique.

In some examples of the method, system, and machine-readable medium described herein, the telemetry data is modulated using one or more techniques.

In some examples of the method, system, and machine-readable medium described herein, modulating the telemetry data comprises performing delta modulation on the telemetry data.

In some examples of the method, system, and machine-readable medium described herein, modulating the telemetry data comprises performing adaptive delta modulation on the telemetry data.

In some examples of the method, system, and machine-readable medium described herein, the generated function is one of: a continuous function, a nearly continuous function, or a step function.

In some examples of the method, system, and machine-readable medium described herein, transfer the modulated telemetry data for reporting when the modulated telemetry data exceeds a predetermined value; and further comprises: performing an action based on the modulated telemetry data exceeding the predetermined value.

In some examples of the method, system, and machine-readable medium described herein, a sampling time period is based on one of: a packet size, port speed, or radix of the network device.

In some examples of the method, system, and machine-readable medium described herein, performs an action based on the modulated telemetry data exceeding the predetermined value.

In some examples of the method, system, and machine-readable medium described herein, receive telemetry data that has been sampled at a given point of time, wherein the telemetry data is associated with a performance metric of a network device; process the telemetry data as a function representing performance of the network device, wherein processing the telemetry data comprises modulating the telemetry data at the given point of time to previously sampled telemetry data based on the function; and transfer the modulated telemetry data for reporting.

DETAILED DESCRIPTION

Figure 1A:
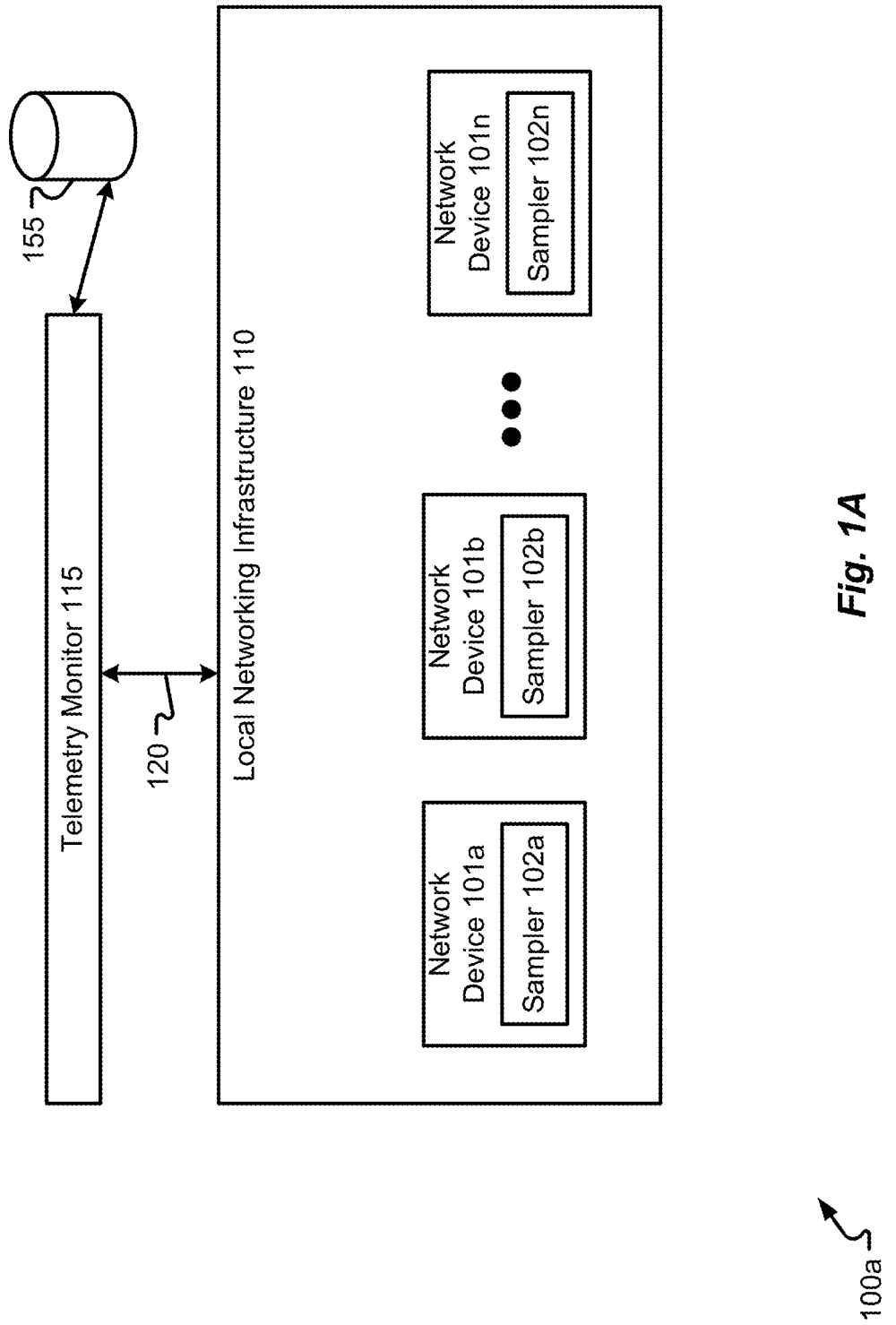
FIGS. 1A-1B illustrate an example of a system that supports modulating telemetry data in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Example aspects of the present disclosure provide telemetry techniques which support, in addition to device performance analysis and flow statistics, security aspects (e.g., secure traffic), improved user experience, and latency reduction. In some cases, the techniques described herein may be applied to telecommunication (e.g., fourth generation (4G) telecommunication networks, fifth generation (5G) telecommunication networks, etc.) and Internet of Things (IoT) rich environments.

Aspects of a cloud infrastructure and/or local network infrastructure may be implemented by a programmable networking infrastructure, which includes telemetry. In some examples, the programmable networking infrastructure may be implemented through Software-Defined Networking (SDN) and Network Functions Virtualization (NFV) techniques. In some aspects, the programmable networking infrastructure may support software-based flow management (e.g., management of packets associated with different packet flows).

Aspects of the disclosure are further illustrated by and described with reference to apparatus diagrams, system diagrams, and flowcharts that relate to modulating telemetry data.

The present disclosure treats telemetry data (e.g., data describing queue/buffer length/size, etc.), as a continuous signal. If the telemetry data is treated as a continuous signal, then signal techniques may be applied to optimize telemetry data processing and reporting. The present disclosure measures telemetry data and modulates the telemetry data to quantize the difference between the current data and the data from the previous step. In embodiments, the modulation may be performed using Delta modulation, and its variations (e.g., adaptive delta). In embodiments, other modulation and/or sampling techniques may be used.

Different configurations may be used for different use cases. For example, the modulation may depend on the packet sizes that are common in a network, and/or on the maximum packet sizes. It may also be related to the ports' speeds and radix of the network device, since these affect the potential rate of change in queue length, hence higher steps may be required.

The present disclosure contemplates that modulation of telemetry data (e.g., actual queue sampling) to a modulated signal can be in performed in various stages: locally in the same device (e.g., some portion of the device) the telemetry data is being sampled, in a centralized component(s) within the ASIC (e.g., a block or unit of the ASIC), in a device within the network device, but not within the ASIC (e.g., a CPU on the same board).

FIG. 1A illustrates an example of system 100a that supports modulating telemetry data in accordance with aspects of the present disclosure.

In an example, the system 100a may include a local networking infrastructure 110, a telemetry monitor 115, database/memory 155, and network devices 101a-n. Network devices 101a-n each include a sampler 102a-n. In embodiments, examples of the network devices 101a-n include servers, endpoints, switches, routers, network interface cards (NIC), central processing units (CPUs), graphics processing units (GPUs), data processing units (DPUs), etc.

The telemetry monitor 115 may support monitoring of devices (e.g., network devices 101a-n, etc.) and data in association with monitoring security, application health, quality, and performance of the local networking infrastructure 110. In some cases, the telemetry monitor 115 may support monitoring of network infrastructure, storage infrastructure, and overall bandwidth capacity and consumption. In some aspects, the telemetry monitor 115 may support cloud monitoring (e.g., with respect to metrics such as cloud availability, Internet latency, outages, etc.) and routing decisions (e.g., with respect to routing data over and between any of the local networking infrastructure 110 and the devices 101a-n, etc.). In embodiments, the telemetry monitor 115 receives telemetry data sampled at network devices 101a-n. For example, the sampler 102a-n in each network device 101a-n, samples telemetry data, which is transferred to the telemetry monitor 115.

The telemetry monitor 115 modulates the telemetry data, received from the network devices 101a-n, as a function representing performance of the network device. By applying modulation techniques, the present disclosure can reduce the amount of telemetry data needed to monitor a network and/or network devices within the network. Modulation may reduce the telemetry data needed by only requiring data when there is a status change/event, and/or by approximating successive telemetry data based on preceding telemetry data. In embodiments, the telemetry monitor 115 may be a separate device. In embodiments, the functions of the telemetry monitor 115 is performed by the network devices 101a-n (e.g., an ASIC performs the functions of the telemetry monitor 115).

Figure 2:
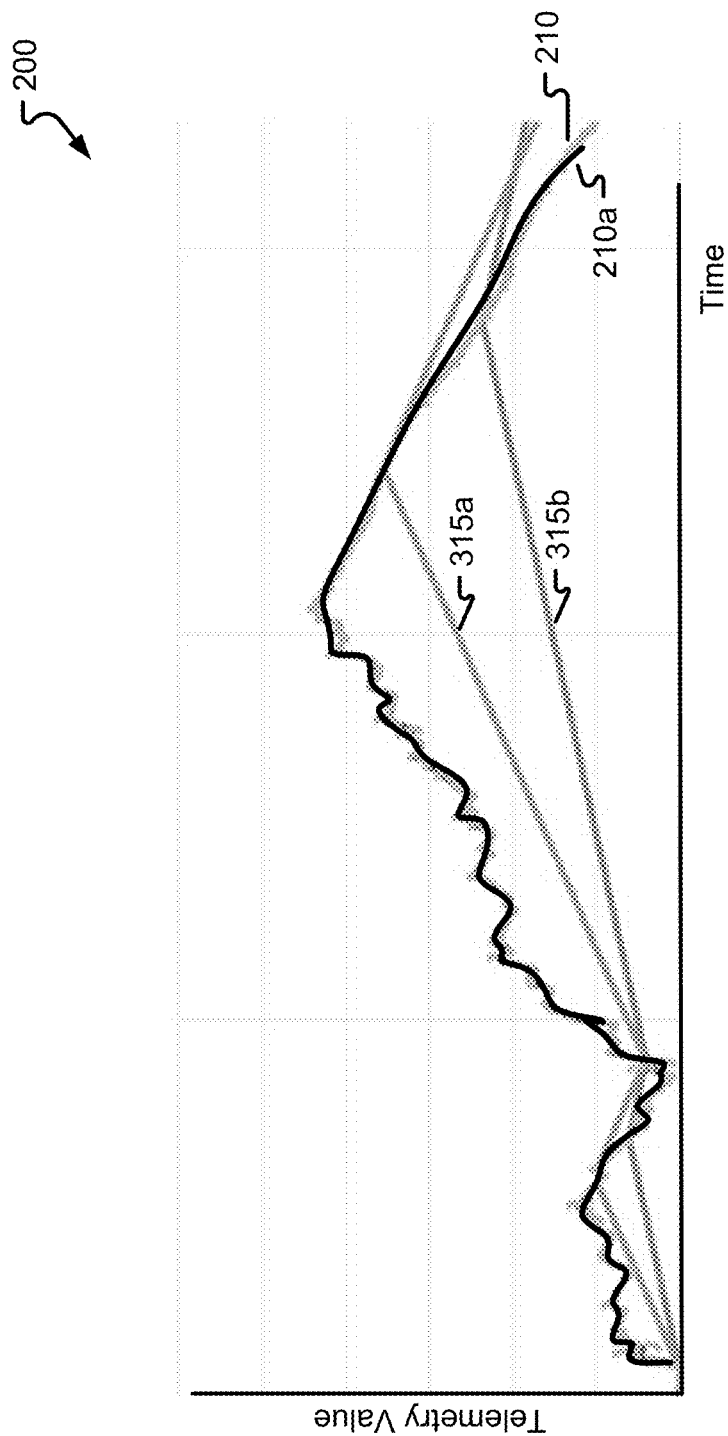
FIG. 2 illustrates an example graph with modulated telemetry data and actual telemetry data in accordance with aspects of the present disclosure.

In embodiments, the telemetry monitor 115 maintains a reference telemetry data and a step size. Each telemetry data input received is compared to the reference telemetry data. For example, in embodiments, if the telemetry data input is larger, the telemetry monitor 115 emits a "1" bit adds the step size to the reference telemetry data. If the telemetry data input is smaller, the telemetry monitor 115 emits a "0" bit and subtracts the step size from the reference telemetry data. The telemetry monitor 115 also keeps the previous N bits of output to determine adjustments to the step size; if the previous N bits are all 1s or 0s, the step size is increased. Otherwise, the step size is decreased (usually in an exponential manner, with). The step size is adjusted for every input processed. An example modulation of telemetry data to approximate the performance of a network device 101a-n is illustrated in FIG. 2. In embodiments, the telemetry monitor 115 may demodulate modulated telemetry data to determine the performance metric associated with the modulated telemetry data.

In addition to monitoring, the telemetry monitor 115 may be able to send instructions to the network and/or network devices 101a-n regarding reconfiguring the network and/or network devices 101a-n. For example, the telemetry monitor 115 may instruct an overloaded network device 101a to offload tasks to another network device 101b. In another example, packets may be re-routed.

The memory 155 may include memory local to the telemetry monitor 115. In some aspects, the memory 155 may store instructions and/or data local to the telemetry monitor 115. The memory 155 may include one or multiple computer memory devices. The memory 155 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 155, in some examples, may correspond to a computer-readable storage media. In some aspects, the memory 155 may be internal or external to the telemetry monitor 115.

The local networking infrastructure 110 and the communication channel 120 may be implemented by any communications network capable of facilitating machine-to-machine communications between entities (e.g., any number of telemetry monitors 115, network devices 101a-n, etc.). For example, the communications networks may include any type of known communication medium or collection of communication media and may use any type of protocols to transport messages, signals, and/or data between endpoints. In some aspects, the communication networks may include wired communications technologies, wireless communications technologies, or any combination thereof. In some examples, the communications networks may support non-secure communication channels and secure communication channels.

The Internet is an example of a network (e.g., a communications network implementing aspects of any of the local networking infrastructure 110 and the communication channel 120, supported by the system 100a, and the network may constitute an Internet Protocol (IP) network consisting of multiple computers, computing networks, and other devices (e.g., telemetry monitor 115 and network devices 101a-n, etc.) located in multiple locations. Other examples of networks supported by the system 100a may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, a cellular network, and any other type of packet-switched or circuit-switched network known in the art. In some cases, the system 100a may include of any combination of networks or network types. In some aspects, the networks may include any combination of communication mediums such as coaxial cable, copper cable/wire, fiber-optic cable, or antennas for communicating data (e.g., transmitting/receiving data).

FIG. 2B illustrates an example of system 100b that supports modulating telemetry data in accordance with aspects of the present disclosure.

In an example, the system 100b may include a local networking infrastructure 110b, including network devices 111a-n. Each network device 111a-n includes a sampler 112a-n and monitor 113a-n. In embodiments, examples of the network devices 111a-n include servers, endpoints, switches, routers, network interface cards (NIC), central processing units (CPUs), graphics processing units (GPUs), data processing units (DPUs), etc.

The monitor 113a-n may support monitoring of devices (e.g., network devices 111a-n, etc.) and data in association with monitoring security, application health, quality, and performance of the local networking infrastructure 110b. In some cases, the monitor 113a-n may support monitoring of network infrastructure, storage infrastructure, and overall bandwidth capacity and consumption. In some aspects, the monitor 113a-n may support cloud monitoring (e.g., with respect to metrics such as cloud availability, Internet latency, outages, etc.) and routing decisions (e.g., with respect to routing data over and between any of the local networking infrastructure 110b and the devices 111a-n, etc.). In embodiments, the monitor 113a-n receives telemetry data sampled at network devices 111a-n. by the sampler 112a-n in each network device 101a-n.

The monitor 113a-n modulates the telemetry data, as a function representing performance of the network device. By applying modulation techniques, the present disclosure can reduce the amount of telemetry data needed to monitor a network and/or network devices within the network. Modulation may reduce the amount of telemetry data transferred over a network. The modulated telemetry data may be transmitted to another device for reporting (e.g., telemetry monitor 115. In embodiments, telemetry monitor 115 may demodulate the modulated telemetry data and process the demodulated telemetry data to determine a status for an associated network device 111a-n and/or local networking infrastructure 110b, etc. In embodiments, the telemetry monitor 115 may also re-modulated the demodulated telemetry data for storage. In embodiments, the telemetry monitor 115 may store the demodulated telemetry data without re-modulating it. The database 155 may store the telemetry data (modulated or demodulated).

In embodiments, the monitor 113a-n maintains a reference telemetry data and a step size. Each telemetry data input received is compared to the reference telemetry data. The monitor 113an-n also keeps the previous N bits of output to determine adjustments to the step size; the step size is adjusted for every input processed. An example modulation of telemetry data to approximate the performance of a network device 101a-n is illustrated in FIG. 2.

In addition to monitoring, the monitor 113a-n may be able to send instructions to the network and/or network devices 111a-n regarding reconfiguring the network and/or network devices 111a-n. For example, the monitor 113a-n may instruct an overloaded network device 111a to offload tasks to another network device 111b. In another example, packets may be re-routed. In embodiments, the modulated telemetry data is sent to another device that demodulates the modulated telemetry data to determine the performance metric associated with the modulated telemetry data.

FIG. 2 illustrates the results of the modulation of telemetry data (e.g., telemetry data representing buffer size, queue length, etc.). In FIG. 2, there is a line 210a (black) overlapping the line 210 (gray), and two lines 215a-b. The line 210a may represent actual telemetry data, and the lines 210a and 215a-b represent modulated telemetry data after the telemetry data is demodulated. That is to say, the lines 210a and 215a-b are modulated using reference telemetry data and periodically received telemetry data. As can be seen in FIG. 2, the line 210a (e.g., modulated data) provides a very close approximation to the line 210 (e.g., actual output). While the lines 215a-b do not provide as close an approximation as the line 210a, the lines 215a-b do accurately track the performance of a network device (e.g., the slopes of all the lines are similar). In embodiments, the telemetry data may be modulated using any modulation technique, such as delta modulation, adaptive delta modulation, etc. As FIG. 2 illustrates by modulating telemetry data, a telemetry device (e.g., telemetry monitor 115) may monitor the status (e.g., queue length) of a network device (e.g., network devices 101a-n) with a very small amount of data being actually transmitted from the device. In embodiments, the telemetry data may be modulated locally in the network device before being transferred to the telemetry monitor 115. In embodiments, the modulation the telemetry data may occur in a device within the network.

Figure 1B:
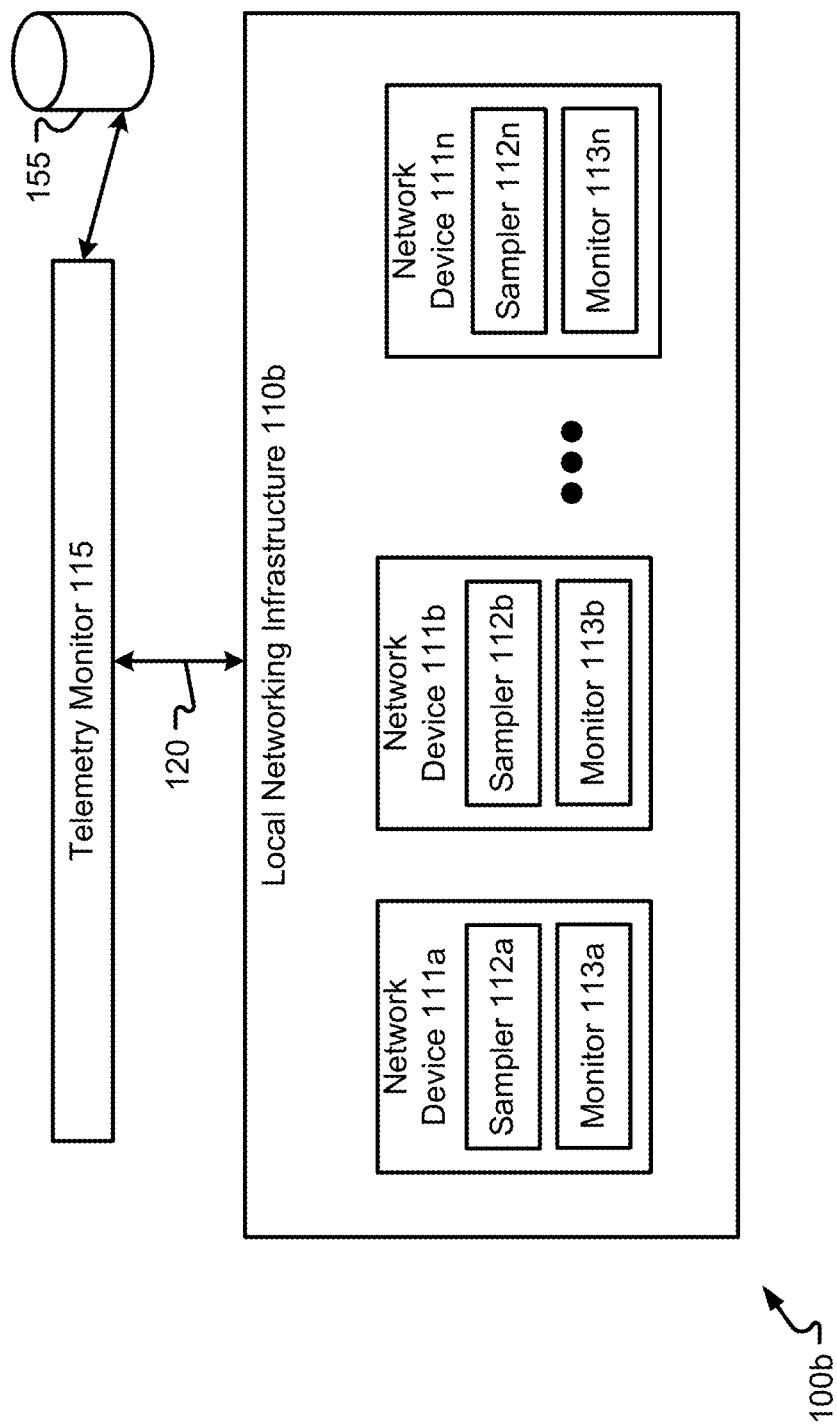
Figure 3A:
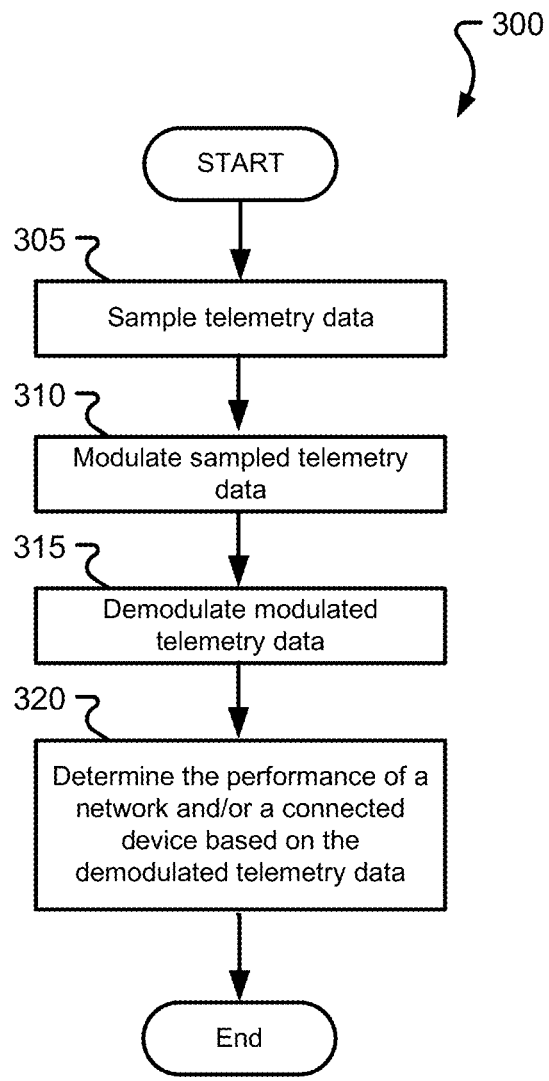
FIGS. 3A-3B illustrate process flows for modulating telemetry data in accordance with aspects of the present disclosure.

FIG. 3A illustrates an example of a process flow 300 that supports modulation of telemetry data in accordance with aspects of the present disclosure. In some examples, process flow 300 may implement aspects of a telemetry monitor 115, monitor 113a-n, or a device 402 described with reference to FIGS. 1A-1B and 4.

In the following description of the process flow 300, the operations may be performed in a different order than the order shown, or the operations may be performed in different orders or at different times. Certain operations may also be left out of the process flow 300, or other operations may be added to the process flow 300.

In step 305, telemetry data is sampled. For example, the sampler 102/112a-n samples telemetry data in one or more of the network devices 101/111a-n. In embodiments where the telemetry data comprises a counter, the next sample will be equal to or greater than the previous sample. In embodiments where the telemetry data comprises a gauge, the next sample may be equal to/greater than/smaller than the previous sample. The telemetry data may have been sampled at a given point of time. The telemetry data is associated with a performance metric (e.g., buffer size, queue length, forwarding-flow load/occupancy, etc.) of a network device (e.g., network devices 101a-n).

In step 310, the sample telemetry data is modulated. More specifically, the telemetry data is modulated at the given point of time to previously sampled telemetry data. In embodiments, the received telemetry data may be modulated using any known modulation techniques (e.g., delta modulation, adaptive delta modulation, etc.). In step 315, the modulated telemetry data is demodulated. By modulating the telemetry data before transferring the telemetry data, the amount of data transferred is reduced.

In step 320, the demodulated telemetry data is used to determine performance of the network (e.g., local network infrastructure 110, network 120, and/or of a network device (e.g., network devices 101/111a-n). In embodiments, a performance metric associated with the sampled telemetry data is determined and compared to a predetermined value. If the performance metric (e.g., dropped packets, queue length, buffer size, etc.) exceeds the predetermined value, an alert is triggered. The alert may be sent to a network administrator to correct the issue. The alert may be automatically sent (e.g., no user intervention) to the associated device with instructions for correction.

Additionally, although not illustrated, the modulated data may be de-modulated. In embodiments, the de-modulated telemetry data may be used to adjust the model/function used to modulate the telemetry data. Additionally, the de-modulated telemetry data may be used to train machine-learning models to monitor the performance of a network and/or network devices within the network.

Figure 3B:
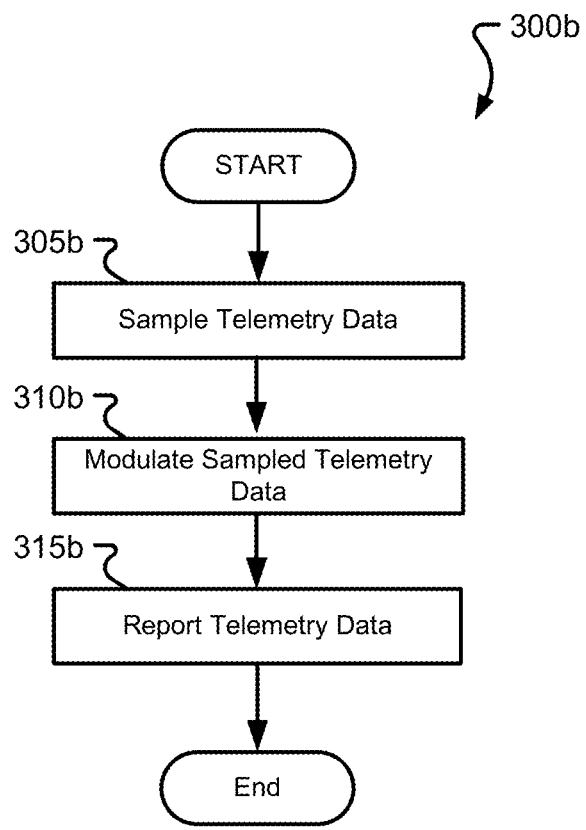

FIG. 3B illustrates an example of a process flow 300b that supports modulation of telemetry data in accordance with aspects of the present disclosure. In some examples, process flow 300b may implement aspects of a monitor 113a-n, telemetry monitor 115 or a device 402 described with reference to FIGS. 1 and 4.

In the following description of the process flow 300b, the operations may be performed in a different order than the order shown, or the operations may be performed in different orders or at different times. Certain operations may also be left out of the process flow 300b, or other operations may be added to the process flow 300b.

In step 305b, telemetry data is sampled. For example, the telemetry data is sampled in one or more of the network devices 101/111a-n. In embodiments where the telemetry data comprises a counter, the next sample will be equal to or greater than the previous sample. In embodiments where the telemetry data comprises a gauge, the next sample may be equal to/greater than/smaller than the previous sample. The telemetry data may have been sampled at a given point of time. The telemetry data is associated with a performance metric (e.g., buffer size, queue length, forwarding-flow load/occupancy, etc.) of a network device (e.g., network devices 101/111a-n).

In step 310b, the sampled telemetry data is modulated. More specifically, the telemetry data is modulated at the given point of time to previously sampled telemetry data. In embodiments, the received telemetry data may be modulated using any known modulation techniques (e.g., delta modulation, adaptive delta modulation, etc.). In step 315b, the modulated telemetry data is reported. For example, the modulated telemetry data may be sent to a monitoring device that demodulates the telemetry data to determine performance of the network and/or of a network device. In embodiments, the reporting may include sending an alert or requesting instructions on reconfiguring the network.

For example, the graph illustrated in FIG. 2 is generated using the process 300a and/or 300b and is used to determine the performance of the network and/or network devices.

Figure 4:
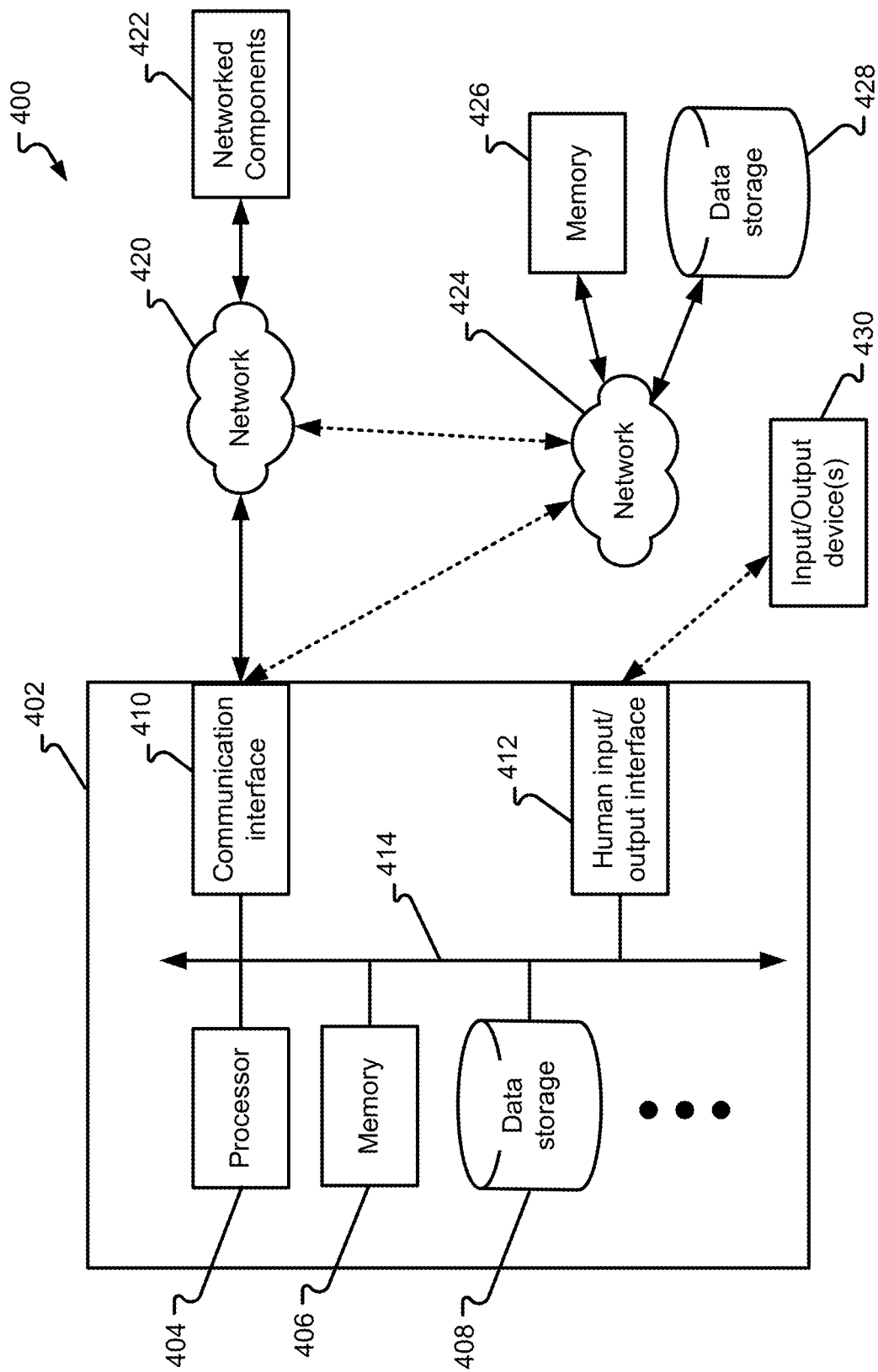
FIG. 4 illustrates an example system for modulating telemetry data in accordance with aspects of the present disclosure.

FIG. 4 depicts device 402 in system 400 in accordance with embodiments of the present disclosure. Device 402 may be an example of the telemetry monitor 115.

The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414.

In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally, or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or utilize one or more networks, such as network 420 and/or network 424. Input/output device(s) 430 may be accessed by processor 404 via human input/output interface 412 and/or via communication interface 410 either directly, via network 424 (not shown), via network 420 alone (not shown), or via networks 424 and 420 (not shown).

Networks 420 and 424 may be a wired network (e.g., Ethernet), wireless (e.g., Wi-Fi, Bluetooth, cellular, etc.) network, or combination thereof and enable device 402 to communicate with networked component(s) 422 (e.g., automation system). In other embodiments, networks 420 and/or 424 may be embodied, in whole or in part, as a telephony network (e.g., public switched telephone network (PSTN), private branch exchange (PBX), cellular telephony network, etc.).

Components attached to network 424 may include memory 426 and data storage 428. For example, memory 426 and/or data storage 428 may supplement or supplant memory 406 and/or data storage 408 entirely or for a particular task or purpose. For example, memory 426 and/or data storage 428 may be an external data repository (e.g., server farm, array, "cloud," etc.) and allow device 402, and/or other devices, to access data thereon. Each of memory 406 and data storage 408, memory 426, data storage 428 comprise a non-transitory data storage comprising a data storage device.

Any of the steps, functions, and operations discussed herein can be performed continuously and automatically.

The exemplary apparatuses, systems, and methods of this disclosure have been described in relation to examples of a telemetry monitor 115. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system, comprising:
   circuitry to:
   receive telemetry data associated with a performance metric of a network device;
   convert, using a modulation technique, the received telemetry data into modulated telemetry data that is a digital representation of the received telemetry data modeled as continuous or nearly continuous function, wherein the modulation technique converts the received telemetry data into the modulated telemetry data by increasing or decreasing reference telemetry data in steps having sizes that are based on a parameter associated with the performance metric of the network device, and wherein the modulated telemetry data is a reduced data set compared to the received telemetry data; and
   transfer the modulated telemetry data for reporting over a network to a monitor device that analyzes the performance metric of the network device.

2. The system of claim 1, further comprising:
   the monitor device that receives the modulated telemetry data, wherein the monitor device demodulates the received modulated telemetry data.

3. The system of claim 2, wherein the monitor device determines whether the performance metric associated with the demodulated telemetry data exceeds a predetermined value.

4. The system of claim 3, wherein, in response to the demodulated telemetry data exceeding the predetermined value, the monitor device performs an action.

5. The system of claim 1, wherein the received telemetry data is sampled by a component within an Application Specific Integrated Circuit (ASIC) of the network device.

6. The system of claim 1, wherein the received telemetry data is sampled by a component within the network device but not an Application Specific Integrated Circuit (ASIC).

7. The system of claim 1, wherein the received telemetry data represents at least one of: a queue length and a buffer size.

8. The system of claim 1, wherein the received telemetry data represents a forwarding-flow load/occupancy.

9. The system of claim 8, wherein the forwarding-flow load/occupancy is measured by one of: a discarded packet counter or a passed packet counter.

10. A telemetry device, comprising:
    circuitry to:
    receive telemetry data associated with a performance metric of a network device;
    convert, using a modulation technique, the received telemetry data into modulated telemetry data that is a digital representation of the received telemetry data modeled as continuous or nearly continuous function, wherein the modulation technique comprises:
    comparing the received telemetry data to stored reference telemetry data;
    increasing or decreasing the stored reference telemetry data by a step based on an output of the comparison, wherein a size of the step is based on a parameter associated with the performance metric of the network device, and wherein the modulated telemetry data is a reduced data set compared to the received telemetry data; and
    outputting the increased or decreased stored reference telemetry data as part of the modulated telemetry data; and
    transfer the modulated telemetry data over a network to a monitor device that analyzes the performance metric of the network device.

11. The telemetry device of claim 10, wherein the network device comprises a network switch.

12. The telemetry device of claim 10, wherein the received telemetry data is sampled by an Application Specific Integrated Circuit (ASIC) within the network device.

13. The telemetry device of claim 10, wherein the received telemetry data represents one of a queue length or a buffer size.

14. The telemetry device of claim 10, wherein the received telemetry data represents a forwarding-flow load/occupancy.

15. The telemetry device of claim 14, wherein the forwarding-flow load/occupancy is measured by one of: a discarded packet counter or a passed packet counter.

16. The telemetry device of claim 10, wherein the parameter comprises one of: packet size, port speed, or radix of the network device.

17. A method, comprising:
    receiving telemetry data associated with a performance metric of a network device;
    converting, using a modulation technique, the received telemetry data into modulated telemetry data that is a digital representation of the received telemetry data modeled as continuous or nearly continuous function, the modulation technique comprising:
    comparing the received telemetry data to stored reference telemetry data;
    increasing or decreasing the stored reference telemetry data by a step based on an output of the comparison, wherein a size of the step is based on a parameter associated with the performance metric of the network device; and
    outputting the increased or decreased stored reference telemetry data as part of the modulated telemetry data, wherein the modulated telemetry data is a reduced data set compared to the received telemetry data; and
    sending the modulated telemetry data over a network to a monitor device that analyzes the performance metric of the network device.

18. The method of claim 17, wherein the parameter associated with the performance metric of the network device comprises one of: packet size, port speed, or radix of the network device.

* * * * *